US008991189B2

(12) United States Patent
Joshi et al.

(10) Patent No.: US 8,991,189 B2
(45) Date of Patent: Mar. 31, 2015

(54) SIDE-INITIATED AUGMENTOR FOR ENGINE APPLICATIONS

(75) Inventors: Narendra Digamber Joshi, Schnectady, NY (US); Adam Rasheed, Glenville, NY (US); Matthew Patrick Boespflug, Clifton Park, NY (US); Seyed Gholamali Saddoughi, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1190 days.

(21) Appl. No.: 12/914,776

(22) Filed: Oct. 28, 2010

(65) Prior Publication Data
US 2012/0102961 A1  May 3, 2012

(51) Int. Cl.
*F02K 3/10* (2006.01)
*F23R 3/20* (2006.01)

(52) U.S. Cl.
CPC .... *F02K 3/10* (2013.01); *F23R 3/20* (2013.01)
USPC ............... 60/765; 60/766; 60/762; 60/761

(58) Field of Classification Search
CPC ..................................... F02K 3/10; F23R 3/20
USPC ........... 60/761, 762, 763, 764, 765, 766, 261, 60/39.5, 746, 264, 241, 243
See application file for complete search history.

(56) References Cited

U.S. PATENT DOCUMENTS

| | | | | |
|---|---|---|---|---|
| 2,909,894 A | * | 10/1959 | O'Donnell | 60/244 |
| 3,118,276 A | * | 1/1964 | Kennan | 60/762 |
| 7,467,518 B1 | * | 12/2008 | Vermeersch | 60/776 |
| 7,475,546 B2 | | 1/2009 | Snyder et al. | |
| 7,596,950 B2 | | 10/2009 | Woltmann et al. | |
| 7,647,775 B2 | | 1/2010 | Muldoon et al. | |
| 7,788,899 B2 | | 9/2010 | Smith | |
| 2007/0044476 A1 | * | 3/2007 | Koshoffer | 60/776 |
| 2008/0245054 A1 | * | 10/2008 | Martensson et al. | 60/267 |
| 2009/0056340 A1 | * | 3/2009 | Woltmann et al. | 60/765 |

* cited by examiner

*Primary Examiner* — William H Rodriguez
*Assistant Examiner* — Carlos A Rivera
(74) *Attorney, Agent, or Firm* — Scott J. Asmus

(57) ABSTRACT

A gas turbine engine augmentor includes at least one fluid based augmentor initiator defining a chamber in flow communication with a source of air and a source of fuel. The chamber includes a plurality of ejection openings in flow communication with an exhaust flowpath. The at least one fluid based augmentor initiator is devoid of any exhaust flowpath protrusions thereby minimizing any pressure drops and loss of thrust during dry work phase of operation. The source of fuel is operable for injecting fuel into the chamber such that at least a portion of the fuel flow is ignited at the plurality of ejection openings to produce a plurality of fuel-rich hot jets radially into the exhaust flowpath.

11 Claims, 3 Drawing Sheets

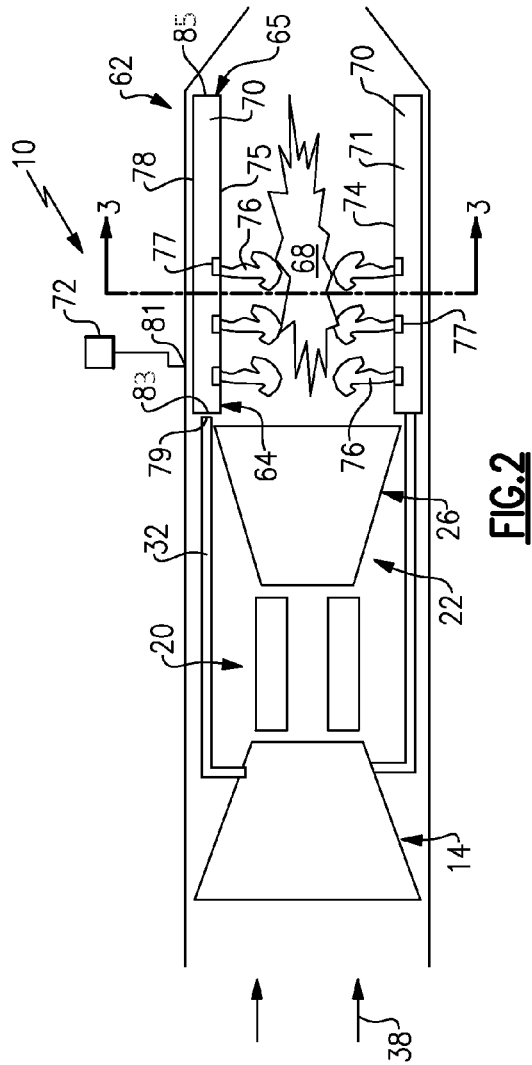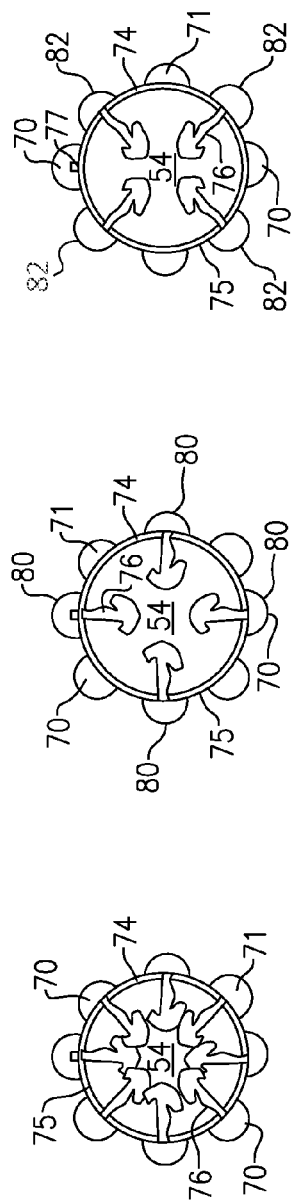

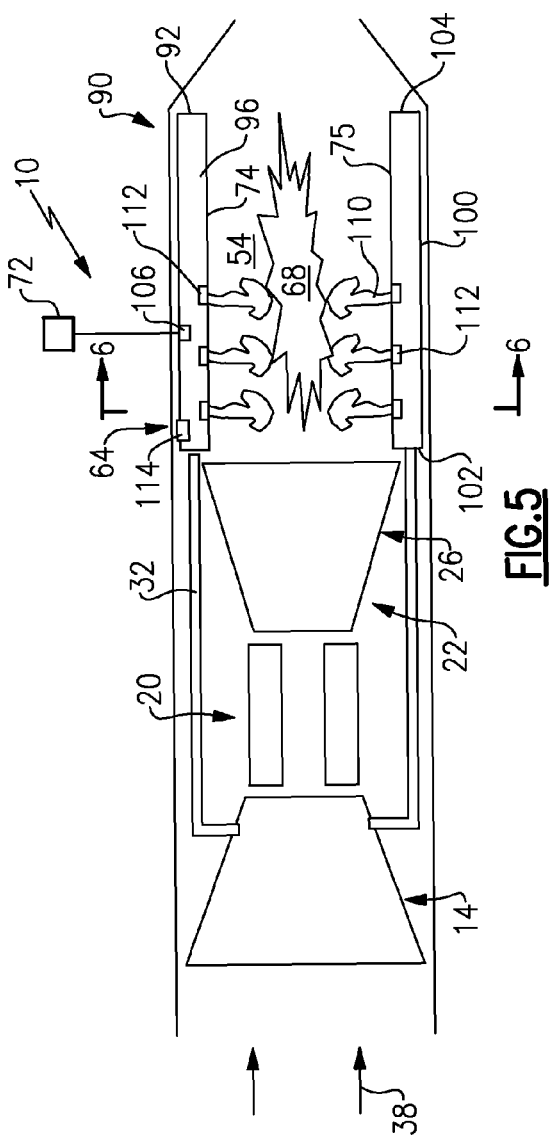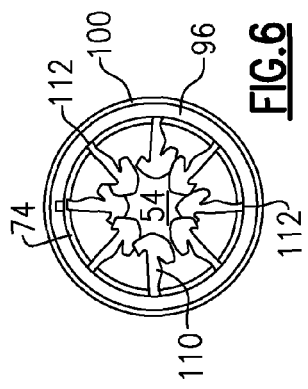

SIDE-INITIATED AUGMENTOR FOR ENGINE APPLICATIONS

BACKGROUND

The present invention relates generally to aircraft gas turbine engines with thrust augmentors and, more specifically, gas turbine engines including side-initiated augmentors.

Today's high performance aircraft typically include an augmented turbine-based propulsion system, such as a turbofan gas turbine engine having an afterburner or augmentor, for providing additional thrust during supersonic flight. The turbofan engine typically includes in downstream serial flow communication, a multistage fan, a multistage compressor, a combustor, a high-pressure turbine powering the compressor, and a low-pressure turbine powering the fan. A bypass duct surrounds and allows a portion of the fan air to bypass the multistage compressor, combustor, high pressure, and low-pressure turbine.

During operation, air is compressed in turn through the fan and compressor and mixed with fuel in the combustor and ignited for generating hot combustion gases that flow downstream through the turbine stages that extract energy therefrom. The hot core gases are then discharged into an exhaust section of the engine that includes an augmenter or afterburner from which they are discharged from the engine through a variable area exhaust nozzle.

Augmentors are located in exhaust sections of engines that include an exhaust casing and an exhaust liner circumscribing a combustion zone. Typically, augmentors include fuel injectors (such as spraybars or v-gutters) and flameholders that are mounted between the turbines and the exhaust nozzle for injecting additional fuel during reheat operations. The injection of additional fuel provides burning in the augmentor and produces additional thrust. Thrust augmentation or reheat using such fuel injection is referred to as wet operation, while operating dry refers to operation conditions where thrust augmentation is not used. In a typical augmentor configuration, the annular bypass duct extends from the fan to the augmentor for bypassing a portion of the fan air around the core engine to the augmentor. This bypass air is mixed with the core gases and fuel from the spraybars and ignited and combusted prior to discharge through the exhaust nozzle. The bypass air is also used in part for cooling the exhaust liner.

Current augmentor designs, such as the above mentioned spraybars and v-gutter designs include components that penetrate the engine flowpath. Augmentor components in the engine flowpath, or gas stream, inherently cause flow losses and reduced engine efficiency. Several modern gas turbine engine's and designs include radially extending spray bars and flameholders in an effort to improve flame stability and reduce losses in the engine flowpath. Radial spray bars disposed between radial flameholders having integrated radial spray bars have been incorporated in the GE F414 and GE F110-132 aircraft gas turbine engines. This arrangement provides additional dispersion of the fuel for more efficient combustion, but does not solve the issue of elimination structure protrusions into the engine flowpath that result in pressure drops.

When an augmented engine operates without the augmentor fueled, or during dry operation, the augmentor components penetrating the engine flow path obstruct the flow therein and create a pressure drop reducing thrust produced by the engine and increasing fuel consumption. Although providing an increased amount of thrust (for short durations), the performance penalty in the pressure drop associated with the typical augmentor fuel injectors and flame stabilizer hardware that is located within the engine flowpath is significant.

Accordingly, there is a need to provide for an engine augmentor that provides an increase in thrust that maintains augmentor performance while minimizing pressure losses in an engine flow path. It is therefore an object of this disclosure to provide for an augmentor that operates without augmentor components impinging on the engine flowpath in a gas turbine engine.

BRIEF DESCRIPTION

Briefly, one aspect of the disclosure resides in a gas turbine engine augmentor including at least one fluid based augmentor initiator defining a chamber in flow communication with a source of air and a source of fuel. The chamber includes a plurality of ejection openings in flow communication with an exhaust flowpath. The at least one fluid based augmentor initiator is devoid of any exhaust flowpath protrusions. The source of fuel is operable for injecting fuel into the chamber such that at least a portion of the fuel flow is ignited to produce a plurality of fuel-rich hot jets radially into the exhaust flowpath.

Another aspect of the disclosure resides in a gas turbine engine augmentor including at least one fluid based augmentor initiator defining a chamber in flow communication with a source of air and a source of fuel. The chamber includes an inner chamber wall, an outer chamber wall, a forward wall and an aft wall. The inner chamber wall includes a plurality of ejection openings in flow communication with an exhaust flowpath. The at least one fluid based augmentor initiator is devoid of any exhaust flowpath protrusions. The source of fuel is operable for injecting fuel into the chamber such that at least a portion of the fuel flow is ignited to produce a plurality of fuel-rich hot jets radially into the exhaust flowpath.

Still another aspect of the disclosure resides in a turbofan gas turbine engine including a core engine including in serial downstream flow communication a high-pressure compressor, a combustor, and a high-pressure turbine. A fan section is located upstream of a core engine. A low-pressure turbine is located downstream of the core engine. An annular bypass duct containing a bypass flowpath circumscribes the core engine. A gas turbine engine augmentor is located downstream of the low pressure turbine. The gas turbine engine augmentor includes at least one fluid based augmentor initiator each defining a chamber in flow communication with a source of air and a source of fuel. Each chamber includes a plurality of ejection openings in flow communication with an exhaust flowpath. The ejection openings extend between a forward end wall and an aft end wall of the chamber. The at least one fluid based augmentor initiator is devoid of any exhaust flowpath protrusions. The source of fuel is operable for injecting fuel into the chamber such that at least a portion of the fuel flow is ignited at the plurality of ejection openings to produce a plurality of fuel-rich hot jets radially into the exhaust flowpath.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 2 is an enlarged schematic axial view illustration of the turbofan gas turbine engine having a side-initiated augmentor according to an embodiment;

FIG. 3 is a sectional view illustration taken through line 3-3 of FIG. 2 illustrating a firing pattern of the side-initiated augmentor illustrated in FIG. 2;

FIGS. 4a and 4b are sectional view illustrations taken through line 3-3 of FIG. 2 illustrating an alternate firing pattern of the side-initiated augmentor illustrated in FIG. 2;

FIG. 5 is an enlarged schematic axial view illustration of an alternate embodiment of the turbofan gas turbine engine having a side-initiated augmentor according to an embodiment; and FIG. 6 is a sectional view illustration taken through line 6-6 of FIG. 5 illustrating a firing pattern of the side-initiated augmentor illustrated in FIG. 5.

DETAILED DESCRIPTION

Figure 1:
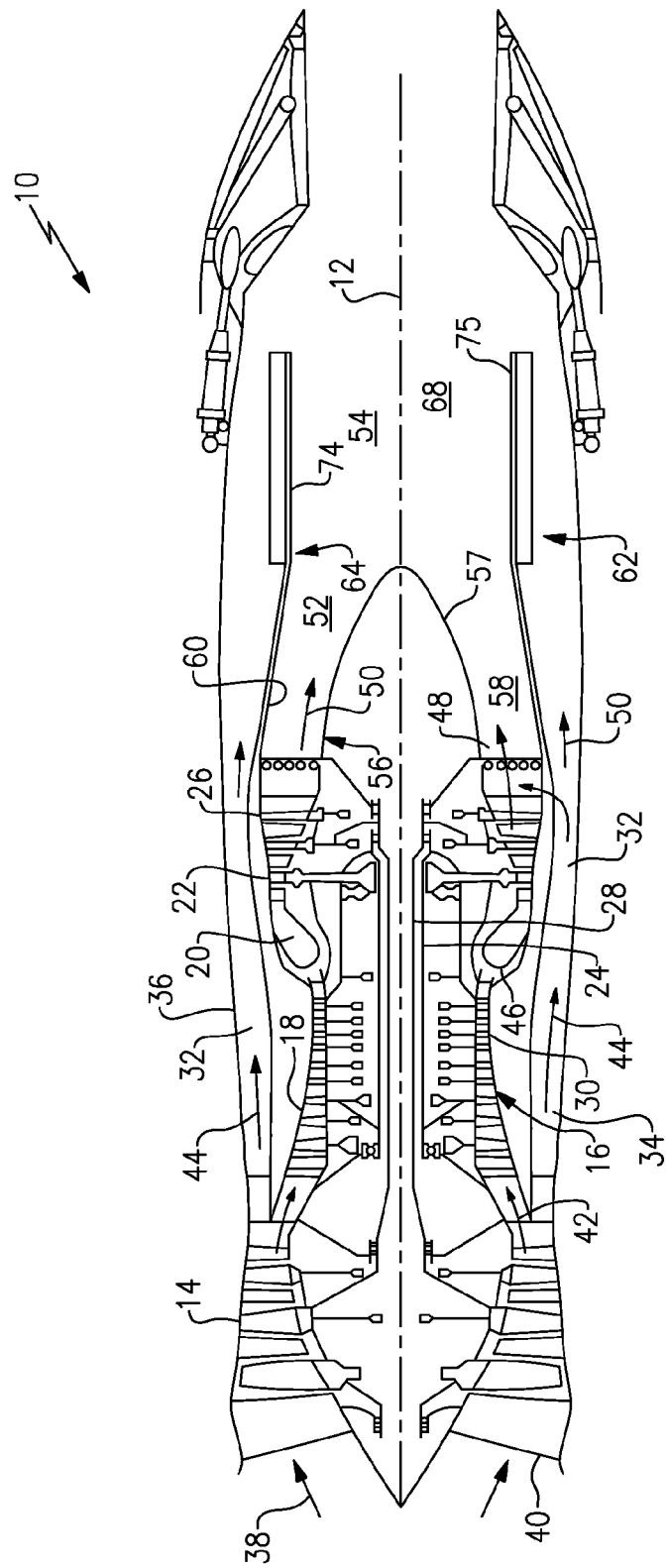
FIG. 1 is an axial sectional view illustration through an exemplary turbofan gas turbine engine having a side-initiated augmentor according to an embodiment.

Illustrated in FIG. 1 is an exemplary turbofan gas turbine engine 10 for powering an aircraft (not shown) in flight. The engine 10 is axisymmetrical about a longitudinal or axial centerline axis 12 and has a fan section 14 upstream of a core engine 16. The core engine 16 includes, in serial downstream flow communication, a multistage axial high-pressure compressor 18, an annular combustor 20, and a high-pressure turbine 22 suitably joined to the high-pressure compressor 18 by a high-pressure drive shaft 24. Downstream of the core engine 16 is a multistage low-pressure turbine 26 suitably joined to the fan section 14 by a low-pressure drive shaft 28. The core engine 16 is contained within a core engine casing 30 and an annular bypass duct 32 containing a bypass flowpath 34 circumscribed about the core engine 16. An engine casing 36 circumscribes the annular bypass duct 32 that extends from the fan section 14 downstream past the low-pressure turbine 26.

Engine air 38 enters the engine through an engine inlet 40 and is initially pressurized as it flows downstream through the fan section 14 with an inner portion thereof referred to as core engine air 42 flowing through the high pressure compressor 18 for further compression. An outer portion of the engine air is referred to as bypass air 44 and is directed to bypass the core engine 16 and flow through the annular bypass duct 32. The core engine air 42 is suitably mixed with fuel by main combustor fuel injectors 46 and carburetors in the annular combustor 20 and ignited for generating hot combustion gases which flow through the turbines 22, 26. The hot combustion gases are discharged through an annular core outlet 48 as core gases 50 into a core stream flowpath 52 which is an upstream portion of an exhaust flowpath 54 extending downstream and aftwardly of the turbines 22, 26 and through a diffuser 56 which is aft and downstream of the turbines 22, 26 in the engine 10. The core stream flowpath 52 is located radially inwardly of the annular bypass duct 32.

The diffuser 56 includes a diffuser duct 58 circumscribed by an annular radially outer diffuser liner 60 and is used to decrease the velocity of the core gases 50 as they enter a side-initiated augmentor 62 of the engine. The centerline axis 12 is also the centerline axis of the side-initiated augmentor 62 which is circumferentially disposed around the centerline axis 12. A converging centerbody 57 extending aft from the core outlet 48 and partially into the side-initiated augmentor 62 radially inwardly bounds the diffuser duct 58. The diffuser 56 is axially spaced apart upstream or forwardly of a forward end 64 of the side-initiated augmentor 62. A combustion zone 68 in the exhaust flowpath 54 is surrounded by the side-initiated augmentor 62 and located radially inwardly from the bypass duct 32 and downstream and aft of the diffuser 56.

Referring to FIGS. 2-4b, illustrated in FIG. 2 is an enlarged schematic axial view illustration of the turbofan gas turbine engine 10 including the side-initiated augmentor 62. FIG. 3 illustrates in a sectional view, taken through line 3-3 of FIG. 2, an exemplary firing pattern of the side-initiated augmentor 62. FIGS. 4a and 4b illustrate in sectional views, an alternate exemplary firing pattern of the side-initiated augmentor 62. In the illustrated exemplary embodiment, the side-initiated augmentor 62 is generally comprised of a plurality of circumferentially and radially spaced apart fluid based augmentor initiators 70. More specifically, the side-initiated augmentor 62 is configured to include a plurality of circumferentially and radially spaced apart fluid based initiators 70 positioned on a portion of an internal engine exhaust nozzle 74, and more particularly an exhaust liner 75, as best illustrated in FIG. 1. In the alternative, the plurality of circumferentially spaced apart fluid based initiators 70 may be formed integral with the exhaust liner 75. Each of the plurality of fluid based initiators 70 is generally configured as a longitudinally oriented closed-end tubular structure, described herein as an initiator chamber 71. Each of the plurality of initiator chambers 71 is generally defined by the exhaust liner 75, an outer wall 78, a forward end wall 83 and an aft end wall 85. Each of the plurality of initiator chambers 71 is in fluid flow communication at an inlet 79 with a source of air, and more particularly, the bypass air 44 or bleed air (FIG. 1) from the compressor 18.

In one exemplary embodiment, the plurality of fluid based augmentor initiators 70 are configured as a can-annular array of pulsed augmentor initiators capable of being fired in different firing patterns, including simultaneous firing as best illustrated in FIG. 3, or alternating firing as best illustrated in FIGS. 4a and 4b. Illustrated in FIG. 3 is the side-initiated augmentor 62 comprised of eight (8) fluid based augmentor initiators 70, and more particularly, eight chambers 71, spaced circumferentially and radially about the internal engine exhaust nozzle 74, thereby circumscribing the exhaust flow path 54. It should be understood that while eight (8) fluid based augmentor initiators 70 are illustrated in the illustrated exemplary embodiment, it is not intended to be limiting and that the side-initiated augmentor 62 may employ any number of fluid based augmentor initiators 70.

During operation, the plurality of fluid based initiators 70 generate turbulent fuel-rich hot jets 76 via plurality of ejection openings 77 formed in the plurality of fluid based augmentor initiators 70, and more particularly in the exhaust liner 75. The plurality of ejection openings 77 formed in the exhaust liner 75 face radially inwardly towards the centerline 12 so as to be in direct unobstructed fluid communication with the combustion zone 68. The fuel-rich hot jets 76 radially penetrate the exhaust flow path 54, and more particularly the combustion zone 68, providing additional thrust to the engine 10. The plurality of fluid based initiators 70 are configured in flow communication with a conventional fuel supply, such as a liquid fuel source 72, which is effective for channeling fuel to each of the plurality of fluid based initiators 70 for ignition. The liquid fuel is injected into each of the chambers 71 at an at least one fuel inlet 81 proximate the forward end 64 and/or an aft end 65 of each of the plurality of chambers 71. The liquid fuel is then ejected at each of the plurality of ejection openings 77, thereby entraining the liquid fuel and vaporizing the liquid fuel in the fuel rich hot jets 76 radially into the exhaust flowpath 54, and into the combustion zone 68. The side-initiated plurality of fluid based augmentor initiators 70 provide multiple fuel rich hot gas jets 76 into the exhaust flowpath 54 for a volumetric ignition.

Referring specifically to FIG. 3, illustrated is an exemplary firing pattern in which the side-initiated augmentor 62, and more particularly the plurality of fluid based pulsed augmentor initiators 70 are configured to fire simultaneously, also referred to as in a steady state. Referring specifically to FIG. 4a, illustrated is an exemplary firing pattern in which the side-initiated augmentor 62 and more particularly the plurality of fluid based pulsed augmentor initiators 70 are configured to fire in an alternating pattern. As best illustrated in FIG. 4a, a first plurality of alternating fluid based augmentor initiators 80 are fired. Subsequent to the firing of the first plurality of alternating fluid based augmentor initiators 80, and as best illustrated in FIG. 4b, a second plurality of alternating fluid based augmentor initiators 82 are fired to achieve a pulsed firing pattern. In addition, it should be understood that additional alternate firing patterns are anticipated by this disclosure and are engine design dependent.

The plurality of fluid based augmentor initiators 70, as previously described, are positioned adjacent the exhaust liner 75 of the internal engine exhaust nozzle 74, thereby providing a means for retrofitting current engine systems. In an alternate embodiment, the plurality of fluid based pulsed augmentor initiators 70 may be integrally formed with the engine exhaust nozzle 74, and more particularly the exhaust liner 75, so as to form an integral augmentor exhaust liner component. Such configuration of the plurality of fluid based augmentor initiators 70 relative to the exhaust flow path 54 provides for a design that is devoid of installed hardware that penetrates into the exhaust flowpath 54. As a direct result, when the augmented turbofan gas turbine engine 10 operates without the side-initiated augmentor 62 in a fueled state, there is no dry-loss due to pressure drop.

Illustrated in FIGS. 5 and 6 is an alternate exemplary side-initiated augmentor 90 according to an embodiment. In this illustrated embodiment, the side-initiated augmentor 90 is configured as a single fluid based annular augmentor initiator 92. More specifically, the side-initiated augmentor 90 is configured to include an annular chamber 96 extending longitudinally about the internal engine exhaust nozzle 74 and circumscribing the exhaust flowpath 54. The annular chamber 96 is defined by a chamber inner wall, and more particularly the exhaust liner 75 (of the internal engine exhaust nozzle 74), a chamber outer wall 100, a chamber forward end wall 102 and a chamber aft end wall 104. The annular chamber 96 is in fluid flow communication with the fan air 44 or bleed air (FIG. 1) proximate the forward end 64 of the fluid based annular augmentor initiator 92. During operation, the fluid based annular augmentor initiator 92 generates turbulent fuel-rich hot jets 110 via a plurality of ejection openings 112 formed in the exhaust liner 75 of the fluid based annular augmentor initiator 92. The plurality of ejection openings 112 formed in the exhaust liner 75 face radially inwardly towards the centerline 12 so as to be in direct unobstructed fluid communication with the combustion zone 68. The fuel-rich hot jets 110 radially penetrate the exhaust flow path 54, and more particularly the combustion zone 68, providing additional thrust. The fluid based annular augmentor initiator 92 is in flow communication with a conventional fuel supply, such as a liquid fuel source 72, which is effective for channeling fuel to the fluid based annular augmentor initiator 92 for ignition. The liquid fuel is injected into the annular chamber 96 at a fuel inlet 106 and ejected at each of the plurality of ejection openings 112, thereby entraining the liquid fuel and vaporizing the liquid fuel in the hot jets 110 radially into the exhaust flowpath 54 resulting in combustion. The fluid based annular augmentor initiator 92 provides multiple hot gas jets 110 radially into the exhaust flowpath 54 for a volumetric ignition.

Referring specifically to FIG. 6, illustrated in a sectional view taken through line 6-6 of FIG. 5, is an exemplary firing pattern in which the side-initiated augmentor 90, and more particularly the fluid based annular augmentor initiator 92 is configured to fire through each ejection opening 112 simultaneously, or in a steady state. In an alternate exemplary firing pattern, the side-initiated augmentor 90 may be configured to fire in an alternating or pulsed pattern.

Similar to the first exemplary embodiment, the fluid based annular augmentor initiator 92 is configured such that it circumscribes the exhaust flowpath 54, but is devoid of any hardware that penetrates into the exhaust flowpath 54. As a direct result, when the augmented turbofan gas turbine engine 10 operates without the side-initiated augmentor 90 in a fueled state, there is no dry-loss due to pressure drop.

In an exemplary embodiment, at least one igniter 114 may be operably disposed within the fluid based annular augmentor initiator 92 for igniting a fuel and air mixture in the annular chamber 96 which then expands into the combustion zone 68 igniting the fuel and air mixture therein. Only one igniter is illustrated in the FIG. 5, but more than one may be used, as well as one or more used within the embodiment illustrated in FIGS. 1-4b.

The side-initiated augmentor therefore is disclosed that provides better engine performance by configuring the engine augmentor components outside of the engine exhaust flowpath, and with no component hardware penetrating the engine exhaust flowpath. By eliminating the positioning of augmentor components within the exhaust flowpath, the engine does not encounter a pressure drop during the augmentor's dry work phase of operation. The elimination of a pressure drop minimizes any reduction in engine thrust during operation and increase in specific fuel consumption due to a loss of engine thrust.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

What is claimed is:

1. A turbofan gas turbine engine comprising:
   a core engine including in serial downstream flow communication a high-pressure compressor, a combustor, and a high-pressure turbine;
   a fan section upstream of a core engine;
   a low-pressure turbine downstream of the core engine;
   an annular bypass duct containing a bypass flowpath circumscribing the core engine; and
   a gas turbine engine augmentor downstream of the low pressure turbine, the gas turbine engine augmentor comprising:
      at least one fluid based augmentor initiator each defining an initiator chamber in flow communication with a source of air and a source of fuel, each initiator chamber defining a closed-end structure for a volumetric ignition and including a plurality of ejection openings in flow communication with the source of air, the source of fuel and an exhaust flowpath, the ejection openings extending between a forward end wall and an aft end wall of the initiator chamber, the at least one fluid based augmentor initiator devoid of any exhaust flowpath protrusions, wherein the source of fuel is operable for injecting fuel into the initiator chamber such that at least a portion of the fuel flow is ignited in the initiator chamber to produce a plurality of fuel-rich hot jets through the plurality of ejection openings and radially into the exhaust flowpath.

2. A turbofan gas turbine engine according to claim 1, wherein the at least one fluid based augmentor initiator defines an annular initiator chamber circumscribing the exhaust flowpath and in fluid flow communication with the source of air, the source of fuel and the exhaust flowpath.

3. A turbofan gas turbine engine according to claim 2, wherein the annular initiator chamber circumscribing the exhaust flowpath is defined having an inner chamber wall, an outer chamber wall, the forward end wall and the aft end wall.

4. A turbofan gas turbine engine according to claim 3, wherein the inner chamber wall is an exhaust liner, and wherein the plurality of ejection openings are formed therein the inner chamber wall.

5. A turbofan gas turbine engine according to claim 1, further comprising a plurality of circumferentially and radially spaced fluid based augmentor initiators defining a plurality of initiator chambers circumscribing the exhaust flowpath, each of the plurality of initiator chambers and in fluid flow communication with the source of air, the source of fuel and the exhaust flowpath.

6. A turbofan gas turbine engine according to claim 5, wherein the plurality of initiator chambers comprise a plurality of circumferentially spaced apart longitudinally tubular chambers.

7. A turbofan gas turbine engine according to claim 6, wherein the plurality of circumferentially spaced apart longitudinally tubular chambers are integrally formed with an exhaust liner.

8. A turbofan gas turbine engine according to claim 6, wherein the plurality of circumferentially spaced apart longitudinally tubular chambers are attached to an outer surface of an exhaust liner, the plurality of ejection openings formed in the chamber configured extending therethrough the exhaust liner.

9. A turbofan gas turbine engine according to claim 1, further including at least one air injection hole in the initiator chamber and in flow communication with a bypass flowpath within a bypass duct and at least one fuel injection hole in the initiator chamber in flow communication with the source of fuel.

10. A turbofan gas turbine engine according to claim 1, wherein the at least one fluid based augmentor initiator is configured to fire in a steady state.

11. A turbofan gas turbine engine according to claim 1, wherein the at least one fluid based augmentor initiator is configured to include a plurality of fluid based augmentor initiators configured to fire in an alternating pulsed state.

* * * * *